United States Patent [19]

Trotter et al.

[11] 4,259,470

[45] Mar. 31, 1981

[54] PROPYLENE/1-BUTENE OR 1-PENTENE/HIGHER 1-OLEFIN COPOLYMERS USEFUL AS PRESSURE-SENSITIVE HOT-MELT ADHESIVES

[75] Inventors: Jimmy R. Trotter; Richard L. McConnell; Frederick B. Joyner, all of Kingsport, Tenn.

[73] Assignee: Eastman Kodak Company, Rochester, N.Y.

[21] Appl. No.: 71,141

[22] Filed: Aug. 30, 1979

[51] Int. Cl.³ .................. C08F 210/06; C08F 210/08; C08F 210/14
[52] U.S. Cl. ............................... 526/348.2; 428/355; 526/348.3; 526/348.6
[58] Field of Search ................ 526/348.2, 348.3, 348.6

[56] References Cited

U.S. PATENT DOCUMENTS

| | | | |
|---|---|---|---|
| 3,631,159 | 12/1971 | Cobbs, Jr. et al. | 526/348.2 |
| 3,642,678 | 2/1972 | Shepherd et al. | 526/348.3 |
| 4,072,812 | 2/1978 | McConnell et al. | 526/348.2 |
| 4,072,813 | 2/1978 | McConnell et al. | 526/348.2 |

*Primary Examiner*—Stanford M. Levin
*Attorney, Agent, or Firm*—Clyde L. Tootle; Daniel B. Reece, III

[57] ABSTRACT

This invention relates to propylene/1-butene or 1-pentene/higher 1-olefin copolymers which provide useful pressure-sensitive hot-melt adhesives. The copolymers contain 5 to 39 mole % of one or more higher 1-olefins of the group 1-hexene, 1-heptene, 1-octene, 1-nonene and 1-decene and have a melt viscosity range of 5,000 to 75,000 cp. at 190° C.

8 Claims, No Drawings

PROPYLENE/1-BUTENE OR 1-PENTENE/HIGHER 1-OLEFIN COPOLYMERS USEFUL AS PRESSURE-SENSITIVE HOT-MELT ADHESIVES

This invention relates to hot melt pressure sensitive adhesive compositions having a novel combination of properties. More specifically, the invention relates to hot melt pressure sensitive adhesive compositions having a novel combination of properties including good tack, peel strength, bleed-through resistance, good resistance to plasticizer migration and good heat stability.

Pressure sensitive adhesive that have good tack and adhere to numerous substrates are widely used by industry in various applications such as in consumer products. For example, one such application is in the construction of floor tiles having a preapplied adhesive for the do-it-yourself market. In this application the pressure sensitive adhesive is thinly coated onto the undersurface of floor tiles and covered with a protective release sheet. Installation of the floor tiles is accomplished by removing the release sheet and pressing the tile into place. The pressure sensitive adhesives presently used in this type application generally contain either a styrene-butadiene rubber or a styrene-isoprene rubber. Although these pressure sensitive adhesives provide adequate adhesive properties, they have certain deficiencies that limit their usefulness. These adhesives have poor resistance to plasticizer migration and consequently, in applications such as for use on floor tiles, allow the plasticizer in the tile to migrate into the adhesive thereby causing the adhesive to soften and string excessively. These prior adhesives also have poor heat stability as evidenced by an excessive change in viscosity when exposed to a temperature of 350° F. (the application temperature) for 24 hours. Another disadvantage of these prior adhesives is that they are expensive to produce because of the large amounts of rubber required in the composition to obtain adequate adhesive properties. Therefore, it would be an advance in the state of the art to have a hot melt pressure sensitive adhesive that has good adhesive properties without the disadvantages associated with the prior pressure sensitive adhesives.

In accordance with the present invention, a propylene/1-butene or 1-pentene/higher 1-olefin copolymer provides a hot melt pressure sensitive adhesive having a novel combination of properties including good resistance to plasticizer migration and good heat stability. The copolymers of this invention can be used alone as pressure sensitive adhesives and such copolymers have improved probe tack and lower viscosity to provide improved coatability. These copolymers also have improved peel strength which is necessary for sealing envelopes, cartons and the like.

The propylene/1-butene or 1-pentene/higher 1-olefin copolymers of this invention contain about 10–55 mole % propylene, about 15–60 mole % 1-butene or 1-pentene and about 5–39 mole % of at least one higher 1-olefin and have a melt viscosity of 5,000 to 75,000 cp. at 190° C. These copolymers are substantially amorphous, showing only weak endotherms at about 40–50° C. by different thermal analysis (DXC-2 instrument). These endotherms represent heats of fusion ($\Delta H_f$) values of <3 cal./g. Although typical polypropylene-type endotherms are not evident, we believe that a very low order of polypropylene-type crystallinity could account for the good cohesive strength of these copolymers when used in pressure sensitive adhesive applications.

The "apparent heat of fusion" ($\Delta H_f$) of a polymer, as defined here, is the total amount of latent heat in cal./gram involved in the melting of all crystalline phases of a crystallizable polymer. $\Delta H_f$ values are readily obtained using thermal analytical instruments, such as the Perkin-Elmer DSC-2 Differential Scanning Calorimeter or the Du Pont Model 990 Thermal Analyzer with differential scanning calorimeter cell. One method for determining $\Delta H_f$ is described in the *Journal of Applied Polymer Science*, 20 1209 (1976). Measurement of $\Delta H_f$ is also described in Du Pont Thermal Analysis Bulletin No. 900-8 (1965). Qualitatively, it is possible to compare the degree of crystallinity of polymers by comparing their $\Delta H_f$ values. It was also found that Tg and density measurements are useful for the characterization of useful copolymers. One suitable method for measuring the Tg (glass transition temperature) of polymers is by Differential Scanning Calorimetry [John Mitchell and Jen Chiu, Anal. Chem. Annual Reviews, 43, 267R (1971); M. J. O'Neill and R. L. Fyans, "Design of Differential Scanning Calorimeters and the Performance of a New System", paper presented at the Eastern Analytical Symposium, New York City, November, 1971]. Density of polymers is generally determined in a density gradient tube (ASTM Method D1505). It has been found that useful copolymers have a density of about <0.87 and a Tg intermediate between that observed for polypropylene (or poly-1-butene) and that of the higher poly-1-olefins. For example, polypropylene has a Tg of about −15° C. and poly-1-hexene has a Tg of about −50° C. (J. Brandrup and E. H. Immergut, Editors, "Polymer Handbook", Interscience Publishers, New York City, 1966). Useful propylene/1-butene/1-hexene copolymers containing 5–39 mole % 1-hexene normally show Tg values of about −18° to −35° C. If the copolymer is too "blocky" (i.e., contains relatively long segments of propylene), the copolymer will have a density of >0.87.

Useful copolymers will generally have the following range of properties:

| | |
|---|---|
| Melt viscosity range, cp. at 190° C. | 5,000–75,000 |
| Density range, g./cc. | 0.85–0.87 |
| Tg range, °C. (glass transition temperature) | −18 to −35 |
| Tm (crystalline melting point) | Generally no characteristic $T_m$ is seen by DSC on these copolymers containing 5–39 mole % higher 1-olefin. However, a weak endotherm at about 40°–50° C., regardless of polymer composition, is usually detected with the DSC-2 instrument. |

The type of catalyst and the polymerization conditions required to provide such copolymers are somewhat limited. In general, the best results have been achieved by using catalyst systems which provide poor stereoregulation in the polymerization of propylene and 1-butene. Combinations of Et$_3$Al with AATiCl$_3$ with Al/Ti molar ratios ranging from about 1:1 to 5:1 have been found to be useful. It is also generally desirable to conduct the polymerization at relatively high temperatures such as from about 110° to about 170° C., preferably 130°–160° C., to provide copolymers having adequate pressure-sensitive adhesive properties.

The preferred melt viscosity range for the unmodified copolymers of this invention include about 10,000 to about 70,000 cp. at 190° C., most preferably about 15,000 to about 50,000 cp. at 190° C. The operable melt viscosity range is 5,000 to 75,000 cp.

The copolymers of this invention can be used alone or blended with tackifying resins. Such tackifying resins can be a hydrocarbon resin such as DAC-B hydrocarbon resin prepared according to the process disclosed in U.S. Pat. No. 3,701,760 as well as other hydrocarbon resins, polyterpenes or synthetic polyterpenes, and the like. One such hydrocarbon tackifying resin is a hydrocarbon resin having a softening point of about 100° C. and available commercially as Resin H-100 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a Ring and Ball softening point of from about 80° C. to about 135° C.; an acid number of from about 0–2, a saponification value of less than about 1; and an iodine value of from about 30 to 100. Examples of such commercially available resins of this type are "Wingtack" 95 and "Wingtack" 115 tackifying resins sold by the Goodyear Tire and Rubber Company, the Sta-Tac and Betaprene A or H resins sold by the Reichhold Chemical Corporation, Arkon resins sold by Arakawa Forest Chemical Industries, and Escorez resins sold by Exxon Chemical Co.

Also other suitable resins are the terpene polymers such as the polymeric, resinous materials obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes. Particularly useful starting materials are terpene mixtures containing at least 20 percent beta-pinene and/or limonene or dipentene (racemic limonene), and the "sulfate turpentine" obtained as a by-product in the sulfate pulping process. Commercially available resins of the terpene type include the Zonarez terpene B-Series and 7000 Series resins from Arizona Chemical Corp. and Nirez resins from Reichhold Chemical Corp. The typical properties reported for the Zonarez Terpene Resins include Ring and Ball Softening points of about 55° to 125° C. (ASTM E-28-67), Color of 2 to 3 (Gardner 1963, 50% in Heptane), Acid Number of less than 1 (ASTM D465-59), Saponification Number of less than 1 (ASTM D464-59) and Specific Gravity at 25° C. of 0.96 to 0.99 (ASTM D1963-61).

The hydrocarbon resins, polyterpenes, or other compatible tackifying resins can be used either alone or in combination. These tackifying resins can be used in amounts of about 1 percent to about 40 percent by weight of the adhesive composition, preferably about 10 percent to about 35 percent by weight.

The pressure sensitive adhesive compositions of this invention are prepared by blending together the two components in the melt at a temperature of about 160° C. to about 200° C. until a homogeneous blend is obtained. Various methods of blending materials of this type are known to the art and any method that produces a homogeneous blend is satisfactory. These components blend easily in the melt and a heated vessel equipped with a stirrer is all that is required. For example, a Cowles stirrer provides an effective mixing means for preparing these hot melt pressure sensitive adhesive compositions.

In addition to the propylene/1-butene or 1-pentene-higher 1-olefin copolymer or blends of such copolymers and tackifier resins, it is desirable for the hot melt pressure sensitive adhesive composition to contain about 0.1 to about 1.5 percent by weight, preferably about 0.25 percent to 1.0 percent by weight, of one or more stabilizers or antioxidants. Antioxidants that are effective for each of the various components can be used. Such antioxidants include, for example, "Ionox" 220 and 330 [tris(di-t-butyl-p-hydroxybenzyl)-trimethylbenzene], "Dalpac" 4C2 [2,6-di(t-butyl)-p-cresol], "Naugawhite" (alkylated bisphenol), "Butyl Zimate" (zinc dibutyl dithiocarbamate), and "Ethyl" 702 [4,4'-methylene bis(2,6-di-tert-butylphenol)]. A particularly effective antioxidant is Irganox 1010 which is identified as pentaerythritol tetrakis[3-(3,5-di-tert-butyl-4-hydroxyphenyl)]propionate.

The following test methods are the ones used to evaluate the hot-melt, pressure-sensitive adhesives of this invention.

1. The melt viscosities of the adhesives are determined according to ASTM Procedure D1238 or in a Brookfield Laboratories, Inc.
2. The glass transition temperatures of the adhesives are determined using a differential scanning calorimeter (Perkin-Elmer DSC-2 instrument) operating over the range of −70° C. to +200° C.
3. The probe tack values of the coated tapes are determined according to the method as described by Testing Machines, Inc., Amityville, New York, the manufacturer of the Polyken Probe Tack Tester (Model TMI80-2). The probe tack values are determined at 23° C. with the Polyken Probe Tack Tester using a 0.5 cm diameter probe, 100 g/cm$^2$ contact pressure, two-second contact time, and 2 cm/second separation speed.
4. The 180° peel adhesion values of the coated tapes are determined according to the Pressure Sensitive Tape Council's PSTC-1 test. The amount of adhesive residue left on the stainless steel testing panels when the bonds are tested is also noted.
5. The thermal stabilities of the adhesives are determined by heating the adhesives to 177° C. in the presence of air for 24 hours in a Brookfield Thermosel viscometer. As a measure of thermal stability, the melt viscosities of the adhesives are determined with the viscometer at 177° C. after 1, 4, 8, 12 and 24 hours and differences from the initial melt viscosity are noted. Char and film formation are also noted.
6. The compatibilities of the various base polymers with the tackifying resins are determined by melting samples of each blend between glass microscope slides on a Mettler hot stage attachment for a microscope. The temperature of the melt is raised to about 150° C., photomicrographs are made, and phase separation (if any) is noted.
7. Heat of fusion by Differential Scanning Calorimetry.

There are numerous uses for the pressure sensitive adhesives of the present invention. One such use is in the construction of women's sanitary napkins. A strip of the pressure sensitive adhesive may be applied to the polyethylene shield of the napkin and then protected by a release sheet. At the time of use, the release sheet is removed and the napkin is held in place by adhering the pressure sensitive adhesive to the undergarment, thus eliminating the need for belts and pins. Removal of the napkin is quick as it strips cleanly from the garment.

Another use of the adhesives of this invention is in the construction of floor tiles having a preapplied adhesive for the do-it-yourself market. The pressure sensitive adhesive is thinly coated onto the undersurface of such floor tiles and covered with a protective release sheet. Quick and permanent installation of the floor tiles is accomplished by removing the release sheet and pressing the tile into place. This technique of installing floor tiles can be extended to other types of coverings such as wall tiles and ceiling tiles.

Other major uses of these pressure sensitive adhesives include their use on tapes and labels.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

This example illustrates one process for the synthesis of a propylene/1-butene/higher 1-olefin copolymer used in the present invention.

In a nitrogen filled dry box, 200 ml. of dry mineral spirits, 195 ml. of 1-hexene (distilled and dried over molecular sieve), and 0.37 g. AATiCl$_3$ are placed into a clean, dry, 1-liter Parr autoclave, equipped with a stirrer. The autoclave is sealed in the dry box. A clean, dry catalyst injector is loaded with 0.36 g. of Et$_3$Al and 35 ml. of dry mineral spirits in the dry box and then it is connected to the autoclave. The molar ratio of Al to Ti in the catalyst is 1.3 to 1.

After removing the autoclave from the dry box, 69 ml. of liquid propylene and 122 ml of liquid 1-butene are pressured into the autoclave. This provides a monomer mixture containing 55 weight percent 1-hexane. The autoclave is heated to 130° C. with stirring. Then the Et$_3$Al solution is injected into the monomer solution to initiate the copolymerization. The copolymerization is exothermic and the temperature of the reaction mixture increase to 150° C. This temperature is maintained for 4 hours and then 200 ml. of isobutyl alcohol is pumped into the autoclave to deactivate the catalyst. The temperature is maintained at 150° C. for an additional 15 minutes. Then the autoclave is cooled to 23° C., vented, and the copolymer is placed in an excess of isobutyl alcohol. The mixture is heated to 105° C. and then cooled. The isobutyl alcohol is decanted from the copolymer and the soft, sticky, colorless copolymer is washed with additional isobutyl alcohol to remove catalyst residues. The copolymer is stabilized with 0.25% Irganox 1010 and vacuum stripped at 200° C. The yield of copolymer is 184 g (76% conversion) and the tacky copolymer has a melt viscosity of 21,000 cp. at 190° C., and a Tg (glass transition temperature) of −32° C. by DSC analysis. It contains 31 mole % 1-hexene, 39 mole % 1-butene and 30 mole % propylene as determined by an NMR analysis.

The copolymer is heated to 177° C. (350° F.) and coated onto poly(ethylene terephthalate) film by means of a hot doctor blade to give a uniform 1-mil coating.

This coated tape performs well as a pressure-sensitive tape material. For example, the polymer coating remains permanently tacky and it has good adhesion to paper, steel, polyethylene, poly(ethylene terephthalate), and the like. When the tape is peeled away from a clean stainless-steel surface, no polymer residue is left on the steel. The tapes are aged at 23° C. for 24 hours after which the tapes have a probe tack value of 751 g/0.5 cm probe and a peel strength (one steel) of 3.5 pounds/inch.

EXAMPLE 2

About 37.5 grams of the poly[30-propylene-co-39-(1-butene)-co-31-(1-hexene) copolymer of Example 1 [21,000 cp. at 190° C. by ASTM D1238; Tg=−32° C.] and 12.5 grams of Wingtack 95 tackifying resin (a synthetic polyterpene hydrocarbon type tackifying resin based on a C$_5$ olefin fraction; Ring and Ball softening point=100°±5° C., iodine number=30, and specific gravity=0.93) are physically blended for 30 minutes at 200° C. under a nitrogen blanket in a glass tube using a stainless steel propeller-type stirrer. The blend is stabilized agaist oxidative degradation by the addition of 0.25 weight % Irganox 1010 antioxidant, pentaerythritol tetrakis[3-(3,5-diterbutyl-4-hydroxyphenyl)propionate]. The resulting blend is removed from the glass tube and allowed to cool to 23° C. At 23° C. the blend is very tacky to the touch. The melt viscosity of the blend is 7860 cp. at 190° C. when measured with a Tinius Olsen Melt Indexer (ASTM D1238) using an 0.04 in. orifice and 2160 g. weight.

Samples of the blend are placed in a Brookfield Thermosel Viscometer and are maintained at 177° C. for 24 hours in contact with air. The samples do not change in melt viscosity during this period and they do not show any evidence of char formation or film formation on the surface of the melt.

The blend has a glass transition temperature (Tg) of −190° C.

The blend is coated from the melt (190° C.) 0.001±0.0002 inch thick onto Mylar film (0.001 inch thick) using a heated doctor blade. The resulting pressure-sensitive tapes are transparent and have a probe tack value of 1110 g./0.5 cm. diameter probe and a 180° peel adhesion value of 5.3 lb./in. width after aging tapes 24 hr. at 23° C. and 50% R.H. The probe tack and 180° peel adhesion values are not affected when tapes are aged for 1 week at 50° C. Similarly good results are achieved using Wingtack 115 tackifying resin (Ring and Ball softening point=115°-120° C., or polyterpene resins such as Zonarez 7100 instead of Wingtack 95.

EXAMPLE 3

The procedure of Example 1 is repeated except that 141 ml of 1-hexene, 115 ml of propylene, and 142 ml of 1-butene are used to prepare the copolymer. The copolymer is obtained in 78% conversion and it has a melt viscosity of 16,000 cp at 190° C. (by ASTM D1238 method) and a Tg of −27° C. The copolymer contains 28 mole % 1-hexene, 37 mole % 1-butene, and 35 mole % propylene. Pressure-sensitive tapes made with this copolymer have a probe tack of 765 g/0.5 cm diameter probe and a peel adhesion value of 3.5 pounds/inch.

EXAMPLE 4

The procedure of Example 1 is repeated except that 141 ml of 1-hexene, 45 ml of propylene, and 205 ml of 1-butene are used to prepare the copolymer. The copolymer is obtained in 72% conversion and it has a melt viscosity of 18,750 cp at 190° C. (by ASTM D1238 method) and a Tg of −30° C. The copolymer contains 31 mole % 1-hexene, 57 mole % 1-butene, and 12 mole % propylene. Pressure-sensitive tapes made with this copolymer have a probe tack value of 859 g/0.5 cm diameter probe and a peel adhesion value of 3.2 pounds/inch.

EXAMPLE 5

The procedure of Example 1 is repeated except that 135 ml of 1-hexene, 125 ml of propylene, and 125 ml of 1-butene are used to prepare the copolymer. The copolymer is obtained in 77% conversion and it has a melt viscosity of 30,650 cp at 190° C. (by ASTM D1238 method). The copolymer contains 24 mole % 1-hexene, 36 mole % 1-butene, and 40 mole % propylene. Pressure-sensitive tapes made with this copolymer have a probe tack value of 571 g/0.5 cm diameter probe and a peel adhesion value of 4.4 pounds/inch.

EXAMPLE 6

The procedure of Example 1 is repeated except that 130 ml of 1-hexene, 145 ml of propylene, and 115 ml of 1-butene are used to prepare the copolymer. The copolymer is obtained in 81% conversion and it has a melt viscosity of 36,880 cp at 190° C. (by ASTM D1238 method). The copolymer contains 17 mole % 1-hexene, 31 mole % 1-butene, and 52 mole % propylene. Pressure-sensitive tapes made with this copolymer have a probe tack value of 522 g/0.5 cm diameter probe and a peel adhesion value of 3.4 pounds/inch.

EXAMPLE 7

The procedure of Example 1 is repeated except that 95 ml of 1-hexene, 150 ml of propylene, and 150 ml of 1-butene are used to prepare the copolymer. The copolymer is obtained in 65% conversion and it has a melt viscosity of 32,140 cp at 190° C. (by ASTM D1238 method). The copolymer contains 14 mole % 1-hexene, 43 mole % 1-butene, and 43 mole % propylene. Pressure-sensitive tapes made with this copolymer have a probe tack value of 382 g/0.5 cm diameter probe and a peel adhesion value of 3.4 pounds/inch.

EXAMPLE 8

The procedure of Example 1 is repeated except that 66 ml of 1-hexene, 160 ml of propylene, and 160 ml of 1-butene are used to prepare the copolymer. The copolymer is obtained in 75% conversion and it has a melt viscosity of 24,190 cp at 190° C. (by ASTM D1238 method). The copolymer contains 7 mole % 1-hexene, 41 mole % 1-butene, and 52 mole % propylene. Pressure-sensitive tapes made with this copolymer have a probe tack value of 450 g/0.5 cm diameter probe and a peel adhesion value of 4.2 pounds/inch.

EXAMPLE 9

The procedure of Example 1 is repeated except that 33 ml of 1-hexene, 180 ml of propylene, and 180 ml of 1-butene are used to prepare the copolymer. The copolymer is obtained in 86% conversion and it has a melt viscosity of 18,750 cp at 190° C. (by ASTM D1238 method). The copolymer contains 4 mole % 1-hexene, 39 mole % 1-butene, and 57 mole % propylene. Pressure-sensitive tapes made with this copolymer have no measurable probe tack after ageing 24 hours at 23° C. This example shows that 4% 1-hexene is insufficient to provide permanent tack in this copolymer system.

EXAMPLE 10

The procedure of Example 1 is repeated except that 180 ml of propylene and 180 ml of 1-butene are used to prepare a copolymer. The copolymer is obtained in 81% conversion and it has a melt viscosity of 18,750 cp at 180° C. (by ASTM D1238 method). The copolymer contains 37 mole % 1-butene and 63 mole % propylene. Pressure-sensitive tapes made with this copolymer have no measurable probe tack after ageing 24 hours at 23° C. This example shows that propylene/1-butene copolymers containing no higher α-olefin do not retain permanent tack after ageing 24 hours.

EXAMPLE 11

The procedure of Example 1 is repeated except that 200 ml of 1-octene, 69 ml of propylene and 122 ml of 1-butene are used to prepare the copolymer. The copolymer is obtained in 75% conversion and has a melt viscosity of 22,000 cp at 190° C. (by ASTM D1238 method) and a Tg of −38° C. The copolymer contains 30 mole % 1-octane, 38 mole % 1-butene and 32 mole % propylene. Pressure-sesnitive tapes made with this copolymer have a probe tack value of 650 g/0.5 cm diameter probe and a peel adhesion value of 3.1 pounds/inch.

EXAMPLE 12

The procedure of Example 1 is repeated except that 200 ml of 1-decene, 69 ml of propylene and 122 ml of 1-butene are used to prepare the copolymer. The copolymer is obtained in 70% conversion and has a melt viscosity of 19,000 cp at 190° C. (by ASTM D1238 method) and a Tg of −34° C. The copolymer contains 26 mole % 1-decene, 40 mole % 1-butene and 34 mole % propylene. Pressure-sensitive tapes made with this copolymer have a probe tack value of 590 g/0.5 cm diameter probe and a peel adhesion value of 2.8 pounds/inch.

EXAMPLE 13

The procedure of Example 1 is repeated except that 100 ml of 1-hexene, 100 ml of 1-octene, 69 ml of propylene and 122 ml of 1-butene are used to prepare the copolymer. The copolymer is obtained in 79% conversion and has a melt viscosity of 24,000 cp at 190° C. (by ASTM D1238 method) and a Tg of −35° C. The copolymer contains 18 mole % 1-hexene, 13 mole % 1-octene, 39 mole % 1-butene and 30 mole % propylene. Pressure-sensitive tapes made with this copolymer have a probe tack value of 780 g/0.5 cm diameter probe and a peel adhesion value of 3.4 pounds/inch.

EXAMPLE 14

The procedure of Example 1 is repeated except that 195 ml of 1-hexene, 70 ml of propylene, and 130 ml of 1-pentene are used to prepare the copolymer. The copolymer is obtained in 77% conversion and it has a melt viscosity of 21,600 cp at 190° C. (by ASTM D1238 method) and a Tg of −33° C. The copolymer contains 34 mole % 1-hexene, 32 mole % 1-pentene, and 34 mole % propylene. Pressure-sensitive tapes made with this copolymer have a probe tack value of 740 g/0.5 cm diameter probe and a peel adhesion value of 3.4 pounds/inch.

EXAMPLE 15

The procedure of Example 1 is repeated except that 250 ml of 1-hexene, 75 ml. of propylene, and 50 ml of 1-butene are used to prepared the copolymer. The copolymer is obtained in 76% conversion and it has a melt viscosity of 22,500 cp at 190° C. (by ASTM D1238 method) and a Tg of −340° C. The copolymer contains 39 mole % 1-hexene, 15 mole % 1-butene, and 46 mole % propylene. Pressure-sensitive tapes made with this copolymer have a probe tack value of 890 g/0.5 cm diameter probe and a peel adhesion value of 4.2 pounds/inch.

Although the invention has been described in considerable detail with particular reference to certain preferred embodiments thereof, variations and modifications can be effected within the spirit and scope of the invention.

We claim:

1. An adhesive composition capable of being used as a hot melt, pressure sensitive adhesive comprising a substantially amorphous propylene/1-butene or 1-pentene/higher 1-olefin copolymer, said copolymer containing about 10 to 55 mole % propylene, about 15–60 mole % of either 1-butene or 1-pentene and about 5 to 39 mole percent of at least one higher alpha-olefin of 6 to 10 carbon atoms, said copolymer having a melt viscosity of 5,000 to 75,000 centipoise at 190° C. and a density less than about 0.87 and a Tg of about −18° to about −35° C.

2. An adhesion composition according to claim 1 wherein said hot melt, pressure sensitive adhesive is a propylene/1-butene/higher 1-olefin copolymer containing about 30 mole % propylene, about 39 mole % of 1-butene and about 31 mole percent of 1-hexene.

3. An adhesive composition according to claim 1 wherein said hot melt, pressure sensitive adhesive is a propylene/1-butene/higher 1-olefin copolymer, containing about 35 mole % propylene, about 37 mole % of 1-butene and about 28 mole percent of 1-hexene.

4. An adhesive composition according to claim 1 wherein said hot melt, pressure sensitive adhesive is a propylene/1-butene/higher 1-olefin copolymer containing about 12 mole % propylene, about 57 mole % of 1-butene and about 31 mole percent of 1-hexene.

5. An adhesive composition according to claim 1 wherein said hot melt, pressure sensitive adhesive is a propylene/1-butene/higher 1-olefin copolymer containing about 40 mole % propylene, about 36 mole % of 1-butene and about 24 mole percent of 1-hexene.

6. An adhesive composition according to claim 1 wherein said hot melt, pressure sensitive adhesive is a propylene/1-butene/higher 1-olefin copolymer containing about 52 mole % propylene, about 31 mole % of 1-butene and about 17 mole percent of 1-hexene.

7. An adhesive composition according to claim 1 wherein said hot melt, pressure sensitive adhesive is a propylene/1-butene/higher 1-olefin copolymer containing about 43 mole % propylene, about 43 mole % of 1-butene and about 14 mole percent of 1-hexene.

8. An adhesive composition according to claim 1 wherein said hot melt, pressure sensitive adhesive is a propylene/1-butene/higher 1-olefin copolymer containing about 52 mole % propylene, about 41 mole % of 1-butene and about 7 mole percent of 1-hexene.

* * * * *